(12) United States Patent
Boudreaux

(10) Patent No.: US 6,466,556 B1
(45) Date of Patent: Oct. 15, 2002

(54) METHOD OF ACCOMPLISHING HANDOVER OF PACKET DATA FLOWS IN A WIRELESS TELECOMMUNICATIONS SYSTEM

(75) Inventor: Paul H. Boudreaux, Garland, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/464,316

(22) Filed: Dec. 16, 1999

Related U.S. Application Data

(60) Provisional application No. 60/145,471, filed on Jul. 23, 1999.

(51) Int. Cl.[7] .................................................. H04Q 7/38
(52) U.S. Cl. ........................ 370/331; 370/390; 455/442; 455/445
(58) Field of Search ................................. 370/331, 332, 370/355, 389, 400, 401, 395, 396, 397, 390; 455/432, 435, 436, 438, 442, 445, 455, 426

(56) References Cited

U.S. PATENT DOCUMENTS

| | | | |
|---|---|---|---|
| 5,825,759 A | * 10/1998 | Liu ............................. | 370/331 |
| 6,131,030 A | * 10/2000 | Schon et al. ................ | 455/438 |
| 6,195,705 B1 | * 2/2001 | Leung ......................... | 370/331 |
| 6,292,667 B1 | * 9/2001 | Wallentin et al. ........... | 455/435 |
| 6,374,112 B1 | * 4/2002 | Widegren et al. ........... | 455/452 |

OTHER PUBLICATIONS

Technical Specification Group, Radio Access Network; Meeting #3, Yokohama, Apr. 21–23, 1999; Manifestations of Handover and SRNS Relocation v.0.1.0.

3rd Generation Partnership Project: Technical Specification Group Services and Systems Aspects; Architectural Requirements for Release 1999; (3G TS 23.121 version 1.0.1); pp. 1–64.

Seshan, et al; Handoffs in Cellular Wireless Networks: The Daedalus Implementation and Experience; Kluwer International Journal on Wireless Communication Systems, 1996.

* cited by examiner

*Primary Examiner*—Lester G. Kincaid

(57) ABSTRACT

A method of controlling handover of real-time packet data flow within a wireless telecommunications system packet domain without disrupting communication between user equipment and the anchor packet gateway. In a preferred embodiment, the wireless telecommunications system includes user equipment such as a wireless telephone, a serving wireless gateway, a drift wireless gateway, and an anchor packet gateway. Once it is determined that handover of real-time packet data flow is needed, the drift wireless gateway is prepared to become the serving wireless gateway. The anchor packet gateway is then prepared for serving wireless gateway relocation by having the anchor packet gateway initiate bicasting of downlink packet data flow. Uplink and downlink packet data flows are then monitored at the drift wireless gateway and the drift wireless gateway and the serving wireless gateway are synchronized for relocation. The drift wireless gateway is then utilized as the new serving wireless gateway.

19 Claims, 9 Drawing Sheets

METHOD OF ACCOMPLISHING HANDOVER OF PACKET DATA FLOWS IN A WIRELESS TELECOMMUNICATIONS SYSTEM

REFERENCE TO PROVISIONAL APPLICATION

This application claims the benefit of U.S. Provisional Application No. 60/145,471, filed Jul. 23, 1999.

1. Field of the Invention

The present invention relates generally to the field of telecommunications and, more particularly, to methods for supporting handover of real-time packet data flows within a wireless telecommunications system.

2. Background of the Invention

Wireless data networks are usually composed of a wired, packet-switched, backbone network and one or more wireless (e.g. cellular radio or infrared) hops connecting mobile hosts to the wired part. The wireless part is organized into geographically-defined cells, with a control point called a base station (BS) for each of these cells. The base stations are on the wired network and provide a gateway for communication between the wireless infrastructure and the backbone interconnect. As a mobile host (MH) travels between wireless cells, the task of routing data between the wired network and the MH must be transferred to the new cell's base station. This process, known as a handoff, must maintain end-to-end connectivity in the dynamically reconfigured network topology.

Network protocols in cellular wireless data networks must update routes as a mobile host moves between cells. As mentioned above, these routing updates combined with some associated state changes are called handoffs. Most current handoff schemes in wireless networks result in data loss or large variations in packet delivery times. Unfortunately, many applications, such as real-time multimedia applications and reliable transport protocols, adapt to long term estimates of end-to-end delay and loss. Violations and rapid fluctuations of these estimates caused by handoff processing often results in degraded performance. For example, loss during handoff adversely affects TCP performance often causing a timeout thus dropping the connection between the TCP client and the host. High packet loss and variable delays result in poor real-time multimedia performance. Furthermore, variable delays often result in gaps or pauses in voice communications.

The current standards working assumptions within GSM/GPRS ETSI groups and 3GPP UMTS groups regarding packet data flows are as follows. Packet data flows are non-real-time. Therefore, handover can be non-real-time. Packet data flows are buffered at the User Equipment (UE) (known as a Mobile Station (MS) in GSM/GPRS) and are also buffered at the SRNS (or SGSN within GPRS). However, the prospect of running voice services (or any other real-time service such as video) over the Packet Domain of UMTS and over the GPRS backbone does exist. When the standards working assumptions are changed to enable these real-time packet data flows, the latency introduced during the currently defined handover procedure is intolerable.

In addition to the current standards working assumption, two variations have been considered. In one variation, the connection with the UE is suspended and resumed as in the standards working assumption. At, the GGSN, the downlink GPRS Tunneling Protocol (GTP) connection is moved to the DRNC (new SRNC) immediately (therefore no buffering is needed at the GGSN). Then, when the SRNC is ready, the suspended connection with the UE is transferred to the DRNC (the new SRNC). Finally, the new downlink GTP tunnel is connected with the transferred UE connection at the DRNC. However, this technique only reduces the "suspend" period during the handover (as compared to the standards working assumption). If multiple GGSNs are connected to the UE when the handover is performed (or if multiple QoS levels were being supported simultaneously), then all of these tunnels would have to be moved before the UE connection could be resumed, which would only increase the pause in the communication.

The other variation that is being considered is to suspend and resume the connection with the UE as in the above described variation. However, each GGSN involved forks its downlink GTP tunnel to send packets to both the SRNC and DRNC, thus minimizing the disruption when the DRNC is ready to take over as the new SRNC.

Other solutions describe methods that utilize excessive air interface resources to accomplish a real-time handover. This is undesirable given the scarcity of radio resources. Therefore, a method and system for supporting handover of real-time packet data flows within a wireless telecommunications system such as the Universal Mobile Telecommunications System (UMTS) Packet Domain which provides a very small interruption or no interruption in packet flow is desirable.

SUMMARY OF THE INVENTION

The present invention provides a method of controlling handover of real-time packet data flow within a wireless telecommunications system packet domain without disrupting communication between user equipment and the anchor packet gateway. In a preferred embodiment, the wireless telecommunications system includes user equipment such as wireless user equipment, a serving wireless gateway, a drift wireless gateway, and an anchor packet gateway. Once it is determined that handover of real-time packet data flow is needed, the drift wireless gateway is prepared to become the serving wireless gateway. The anchor packet gateway is then prepared for serving wireless gateway relocation by having the anchor packet gateway initiate bicasting of downlink packet data flow. Uplink and downlink packet data flows are then monitored at the drift wireless gateway and the drift wireless gateway and the serving wireless gateway are synchronized for relocation. The drift wireless gateway is then utilized as the new serving wireless gateway.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
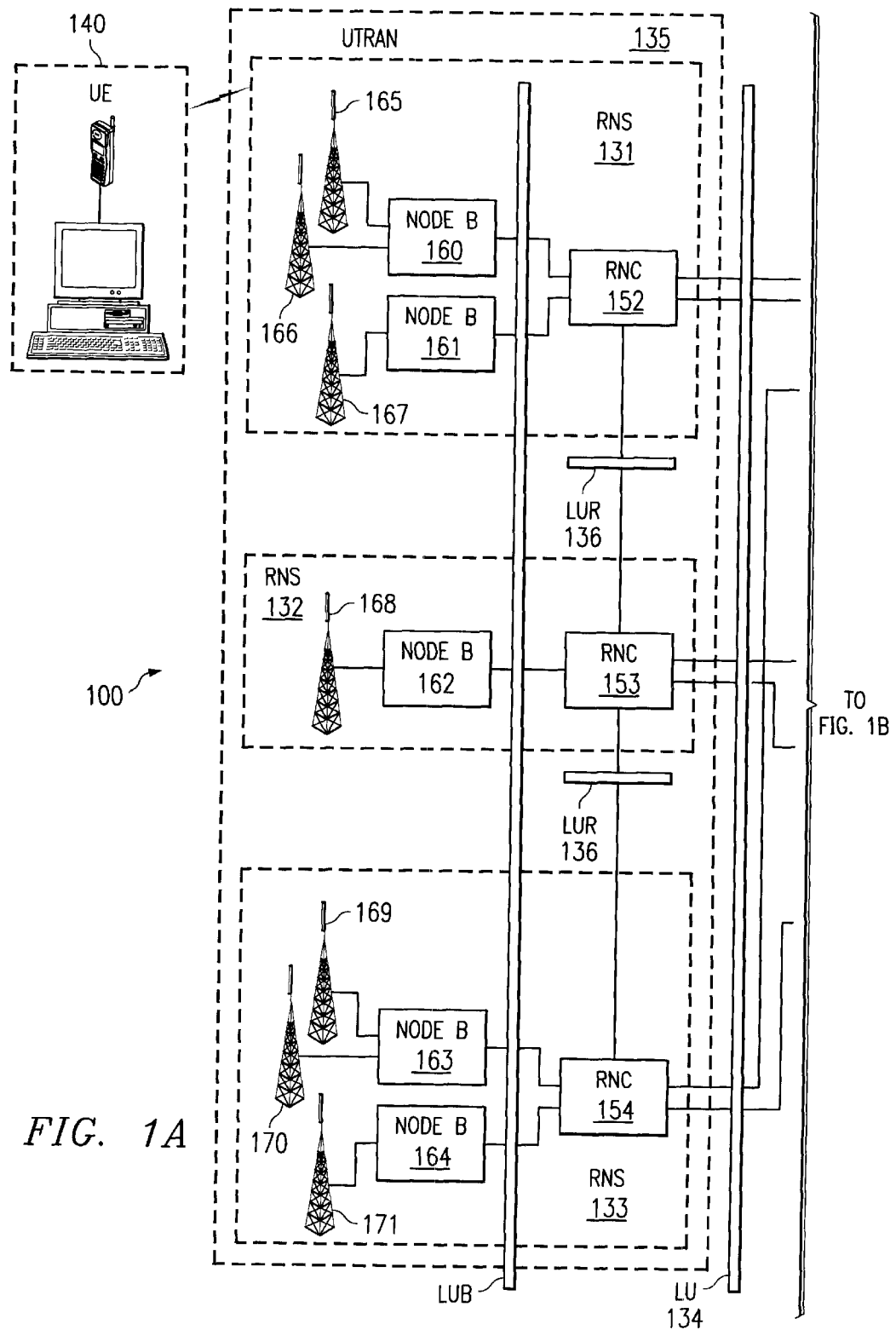
FIGS. 1A–1B show shows a block diagram of a Universal Mobile Telecommunications System (UMTS) Logical Network Architecture 100 in which the present invention may be implemented.
Figure 1B:
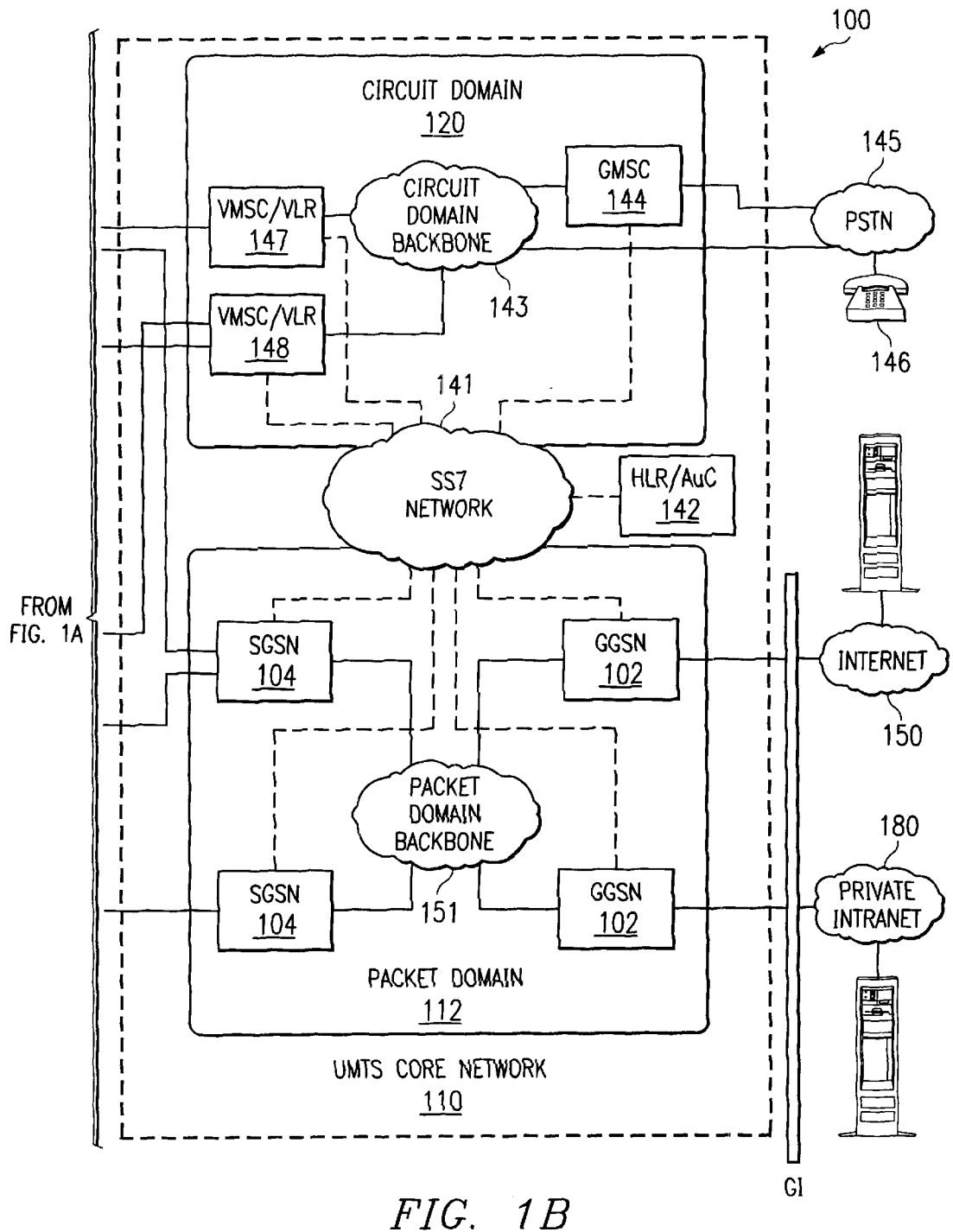

With reference now to the figures and, in particular, with reference to FIGS. 1A–1B, there is shown a block diagram of a Universal Mobile Telecommunications System (UMTS) Logical Network Architecture 100 in which the present invention may be implemented. UMTS Network 100 includes a UMTS Core Network 110 which consists of a UMTS Packet Domain 112 and a UMTS Circuit Domain 120. UMTS Packet Domain 112 consists of two logical nodes: a Gateway General Packet Radio Service (GPRS) Support Node (GGSN) 102 and a Serving GPRS Support Node (SGSN) 104. GGSN 102 sits at the edge of a wireline packet data network (such as the Internet 150 or a private intranet 180) and forms a gateway into the GPRS backbone network or Packet Domain Backbone network 151. SGSN 104 is a node from the GPRS architecture that supports GPRS packet sessions and the associated control functions. Other nodes within a Global System for Mobile communications (GSM) network and within UMTS Network 100 are also engaged in supporting services of the UMTS Packet Domain 112.

UMTS Core Network 110 interconnects with the SS7 Network 141 that connects the packet domain 112 to circuit domain 120. Also connected to SS7 Network 141 is a Home Location Register and Authentication Center (HLR/AuC) 142. HLR/AuC 142 is a node in GSM and UMTS networks that store permanent subscriber configuration data. HLR/AuC 142 also handle the highest level of mobility management spanning an entire Public Land Mobile Network (PLMN) which is a single operator's wireless network. Circuit Domain 120 includes a circuit domain backbone 143 which consists of switches as well as other devices. Circuit domain backbone 143 may be realized as an ATM network using AAL2 (ATM Adaptation Layer 2) for transporting narrowband voice in the native encoding (such as AMR—Adaptive MultiRate) going to/from the User Equipment (UE) 140. At the point of interconnection to Public Switched Telephone Network (PSTN) 145, some interworking function (IWF) transforms that ATM/AAL2 into something the PSTN 145 can handle (i.e., TDM—time division multiplex, trunks). This IWF hosts a transcoding rate adaptation unit (TRAU) to perform the conversion from AMR to G.711 (PCM in uLaw or Alaw encoding). Circuit domain backbone 143 might also be an IP network with systems (such as the MSC) to transform the voice at the Iu interface AAL2 (as per current Iu standards for the Circuit Domain) into an IP transport. Circuit domain backbone 143 is connected to a Gateway Mobile Services-switching Center (GMSC) 144, which is connected to PSTN 145. GMSC 144 is required for mobile terminated calls (calls from PSTN 145) only. Mobile originated calls (calls to PSTN 145) do not necessarily traverse GMSC 144. GMSC 144 is a logical software entity and may be hosted on any physical MSC. In typical deployments, most Mobile Services-switching Centers (MSCs) host a PSTN point of presence.

When a mobile terminated call is routed, it will come to GMSC 144 according to the assigned MSISDN. GMSC 144 subsequently re-routes the call to the VMSC (visited MSC) that the mobile being called is attached to at the moment. It is possible that the VMSC and GMSC for a given call are one and the same. (A "VMSC" is also referred to as simply an "MSC"). PSTN 145 provides connections to individual telephones 146 and other devices. Circuit Domain Backbone 143 is also connected to Mobile Services-switching Center/Visitor Location Register (VMSC/VLR) 147, 148. VMSC/VLR 147, 148 are switches that serve circuit switched mobile calls and also include a local cache of subscriber data. (The GSM term for the network of MSCs, HLRs, etc. that make up a PLMN but not including the BSS is a Network Services System (NSS).)

The UMTS Packet Domain 112 and GPRS are very similar with respect to the control plane (signaling messages). However, the SGSN 104 in UMTS has minimal (potentially no) involvement with the user plan (bearer channel). In GPRS, the SGSN is heavily involved with the user plane. In the UMTS Packet Domain 112, the user plane functions for packet encryption and compression (that the SGSN performs in GPRS) are supported in the Radio Network System (RNS) 131, 132, and 133 of the UMTS Terrestrial Radio Access Network (UTRAN) 135.

The transport protocol stack between the RNS 131, 132, and 133 and the UMTS Core Network Packet Domain 112 (across the Iu reference point 134) are different than the transport protocols between the GSM Base Station Subsystem (BSS) and the SGSN 104 (across the Gb reference point). The transport protocol for the user plane of the Packet Domain 112 across Iu reference point 134 is the General Packet Radio Service (GPRS) Tunneling Protocol (GTP) user plane aspects. The Radio Access Network Application Part (RANAP) protocol is utilized instead of the GTP Control Plane aspects across the Iu reference point 134. From SGSN 104 to GGSN 102 across Packet Domain Backbone 151, both the GTP user plane and control plane are utilized in accordance with the GPRS Gn reference point definition GPRS is a packet data service defined to operate over GSM radio traffic channels. It defines a shared "packet switched" air interface as opposed to the "dedicated' channels used in circuit services of GSM such as voice service. GPRS utilizes the same HLR as circuit services do for subscriber management and macro mobility management. It also shares the BSS with circuit services. Coordination of location information and services between GPRS and "classical GSM" services are specified. (It is not a complete "overlay" service.) Radio channels can be either dedicated to GSM Circuit services or GPRS packet services or they can be dynamically allocated to these services.

The GPRS Gn reference point between the SGSN and the GGSN is present within the UMTS Packet Domain Core Network 110. The user plane aspects of GTP are routed (at the IP transport level) over the Gn reference point and the control plane aspects are generated from the SGSN based on stimulus from the RANAP protocol on the Iu reference point 134.

UMTS Terrestrial Radio Access Network (UTRAN) 135 is connected to UMTS Core Network 110 across the Iu reference point 134 and provides the interface between User Equipment (UE) 140 (also referred to as mobile stations) and UMTS Core Network 110. UE 140 may include, for example, a wireless telephone and a data processing system such as a laptop or other personal computer. UTRAN 135 includes a plurality of Radio Network Subsystems (RNS) 131–133 which includes a Radio Network Controller (RNC) 152–154 and some number of Node B 160–164 (which host some number of radio channels). RNCs 152–154 analogous to what is referred to as Base Station Controllers (BSCs) in GSM. A BSC controls many Base Transceiver Stations (BTSs) (a node that hosts the radio equipment for a PLMN), TCUs and PCUs. Node Bs 160–164 is a UMTS term used to describe a node which hosts some number of radio resources 165–171 and is very similarly to a BTS in GSM.

The Node Bs 160–164, RNCs 152–154 and RNSs 131–133 make up a Radio Access Network (RAN). A RAN is a UMTS term for what is a Base Station Sub-system (BSS) in GSM. This collection of nodes provides radio access for UMTS mobile subscribers. A BSS is the collection of nodes that make up the part of the PLMN that is focused in providing radio access for mobile terminals.

The present invention provides a method of handover that keep the packets flowing for as long as possible during the handover procedure. There is either a very small interruption or no interruption in the flow. This is accomplished by duplicating the packet flow to and from the SRNC and DRNC until the DRNC can taker over as the new SRNC. This process can be implemented in a wireless network system such as UMTS 100. Furthermore, this handover is accomplished in UMTS by utilizing the transmission resources of the UMTS Core Network links while minimizing the use of transmission resources on the wireless link to the UMTS User Equipment (UE).

To aid in understanding the processes of the present invention, currently implemented methods of handover will now be described with reference to UMTS architecture 100. UMTS describes two methods of handover with respect to the User Equipment (UE) 140 (known as Mobile Station (MS) in GSM/GPRS). One method is soft handover and the other method is hard handover. For more details concerning these methods, refer to Technical Report I3.02 "Manifestations of Handover and SRNS Relocation" from the 3GPP Technical Specifications Group, Radio Access Network which is incorporated herein by reference.

Soft handover provides a continuous radio connection with the UE 140 by transmitting and receiving on multiple radio channels (when the UE 140 is within range of multiple base stations) and selecting the best signal to forward on to the connected party. (Soft handover is supported only within the UTRAN 135.)

Hard handover breaks the radio connection with a UE 140 and then reconnects the UE 140 on another radio connection. Hard handover is essentially the traditional handover from the GSM networks. When a UE moves such that its coverage needs to be supported by a neighboring UTRAN (not shown) (connected with the same Core Network 110), a hard handover is required. As a UE 140 moves between RNSs 131, 132, and 133 within the span of control of a single UTRAN 135, soft handover may be performed as RNSs 131, 132, and 133 may be interconnected via the Iur reference point 136. The RNS 131, 132, 133 that "anchors" the connection between the UTRAN 135 and the Core Network 110 at the Iu reference point 134 is considered the Serving RNS (SRNS). The RNS 131, 132, 133 that is hosting the base station that is currently serving a given UE is considered the Drift RNS (DRNS). At some point, the UTRAN 135 may have determined that it should migrate the SRNS function to the DRNS for a given UE 140. This movement is called SRNS Relocation and it changes the point of attachment to the Core Network (CN) 110. This change occurs as an optimization step and may not be closely timed with the movement of the UE 140. Additionally, as a UE 140 moves, it can cause a hard handover to occur within a UTRAN. The hard handover causes a real-time change to the point of attachment at the CN 110 that is timed precisely with the UE 140 movement. Finally, a hard handover occurs as a UE 140 moves between alternative Radio Access Network types (such as dual mode (GSM and UMTS) phone might perform in a handover between a GSM BSS and a UTRAN, so called "2G to 3G handover").

The handover scenarios for real-time packet data flows supported with the present invention are SRNS Relocation, hard handover with a UTRAN, and hard handover between RAN types ("2G to 3G handover").

Figure 2A:
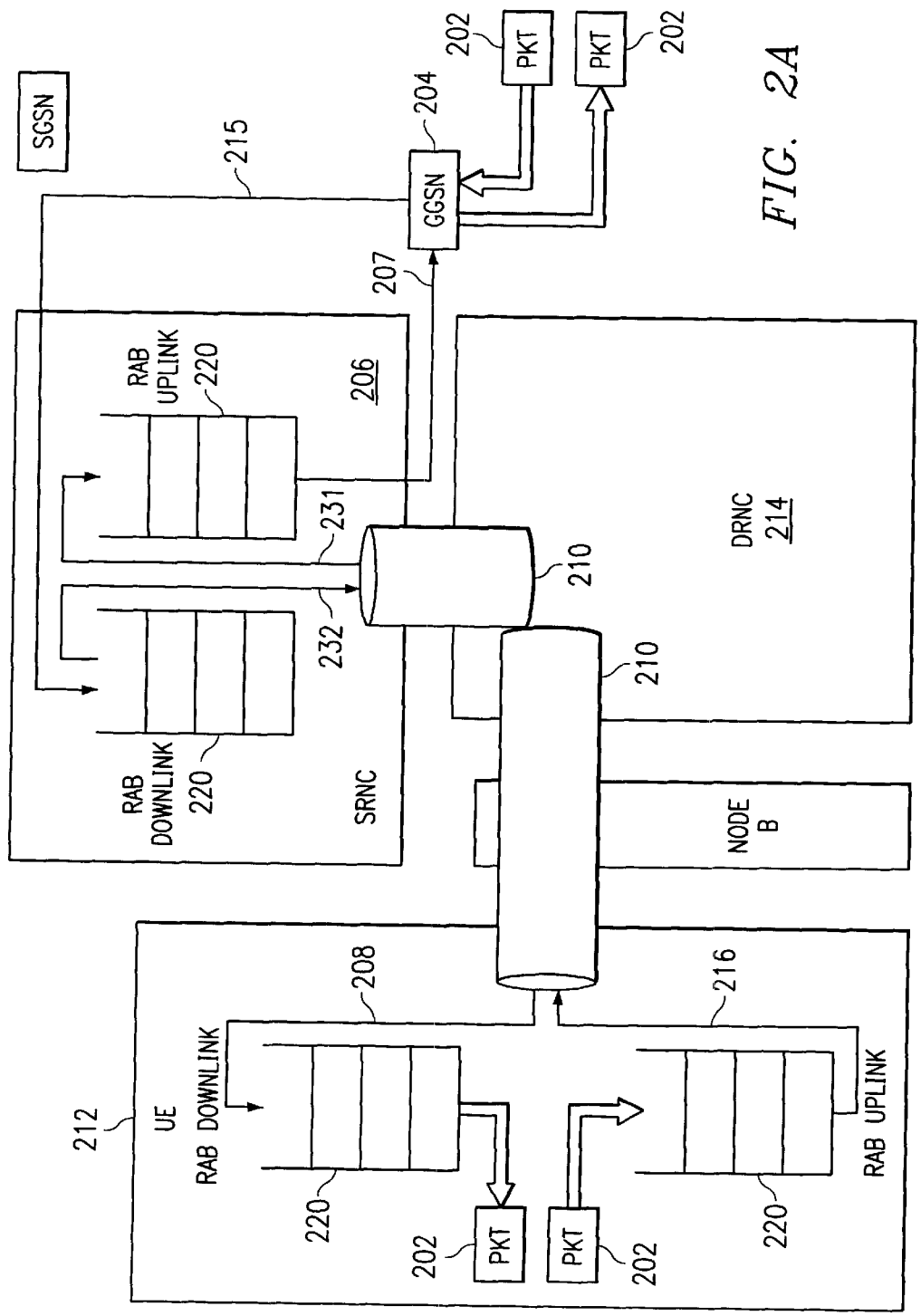
FIGS. 2A–2B show block diagrams illustrating the state of the packet flow connection before and after the handover procedure is performed.
Figure 2B:
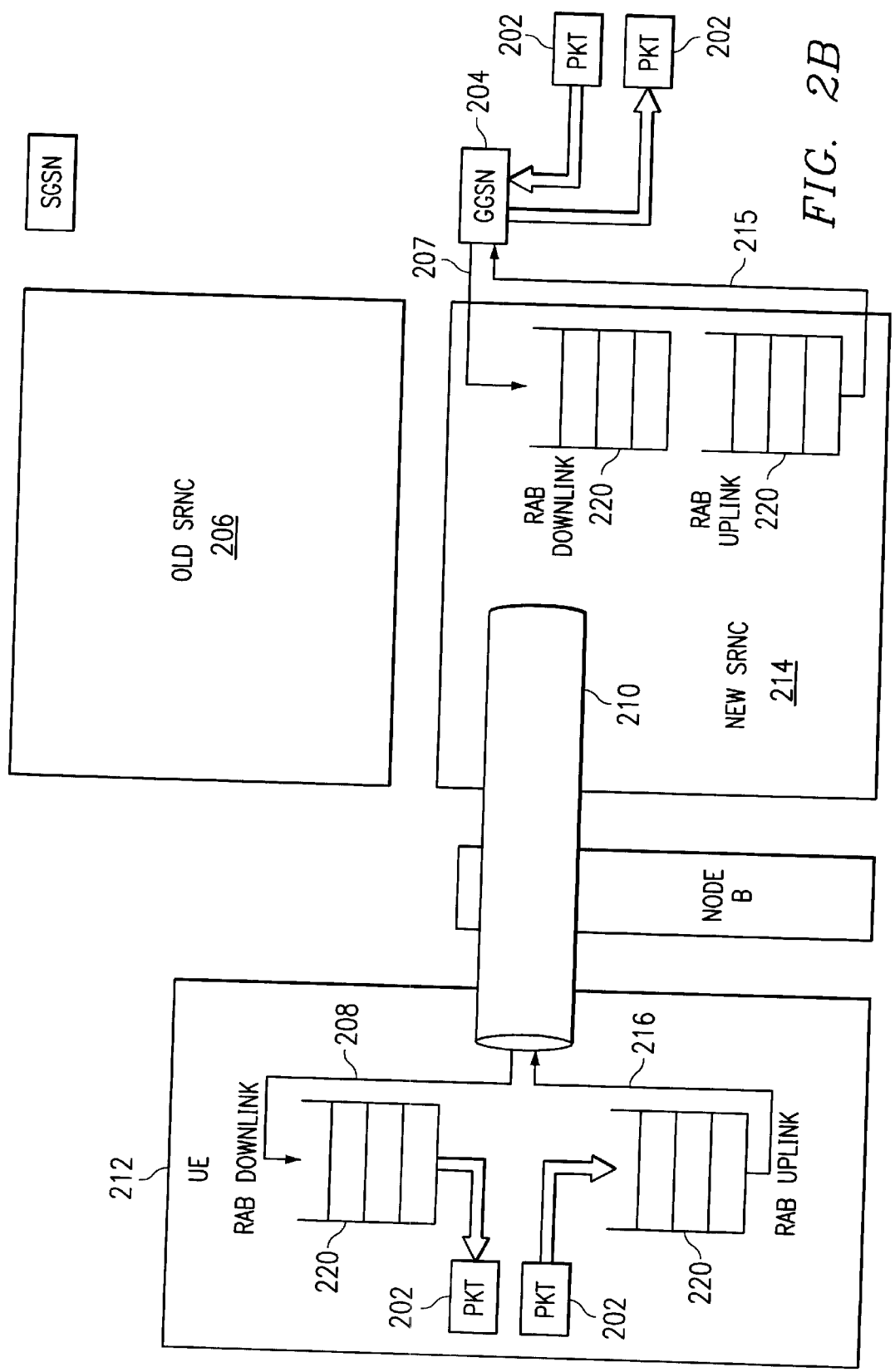

Turning now to FIGS. 2A–2B, block diagrams illustrating the state of the packet flow connection before and after the handover procedure is performed is shown. At the starting point as shown in FIG. 2A, packets 202 are sent to and transmitted from GGSN 204 to the connected party (not shown). The GGSN 204 then sends and receives these packets 202 to and from Serving RNC (SRNC) 206 (the RNC which is currently anchoring traffic channels for a given UE) through a radio access bearer (RAB) downlink 207 and RAB uplink 215. A RAB plus GTP Tunnel exists for the UE 212 to a GGSN 204. Note that potentially Radio Link Control (RLC), Media Access Control (MAC), and Radio Link Physical Layer protocol state information, buffers, and ciphering parameters are present both at SRNC 206 and UE 212.

Due to soft handover, a Drift RNC (DRNC) 214 has been established. A DRNC is an RNC that directly serves the Node B 160–164 that a given UE 140 can be reached through. Traffic channels are routed through DRNC 214 to SRNC 206 where the channel is anchored via Radio Resource Connection (RRC) 210. An RAB downlink 231 and uplink 232 connect RRC 210 to buffers 220 of SRNC 206. RLC is a link layer protocol present in both GPRS and UMTS (although not the same exact protocol) which runs directly on the Media Access Control (MAC) layer. It has provisions for retransmissions and error correction. MAC is an access contention protocol present both in GPRS and UMTS (although not the same exact protocol) which runs directly on the UMTS Radio Link Physical Layer. Ciphering is performed at the RLC protocol layer for RLC Acknowledged and Unacknowledged connections. Ciphering is performed at the MAC protocol layer for RLC Transparent connections. The Radio Resource Connection (RRC) traverses this DRNC on its way to the SRNC 206. At the ending point as shown in FIG. 2B, RRC 210 is re-routed to avoid the old SRNC 206 and the old DRNC 214 is now the new SRNC 214. GTP is defined in GSM to provide transport of GPRS packet sessions from the SGSN to the GGSN. In UMTS, this same protocol is used between the SGSN and GGSN. The RNC also uses the "U-Plane" of this protocol to send packet data over the Iu interface 134.

RAB is a term used in UMTS to describe the channel established between the RNC and nodes within the Core Network to carry circuit or packet services. The RNC chooses the appropriate radio resources to support a given RAB request. A RAB for the UMTS Packet Domain is a GTP Tunnel. A RAB for the UMTS Circuit Domains is an ATM AAL2 connection.

Figure 3:
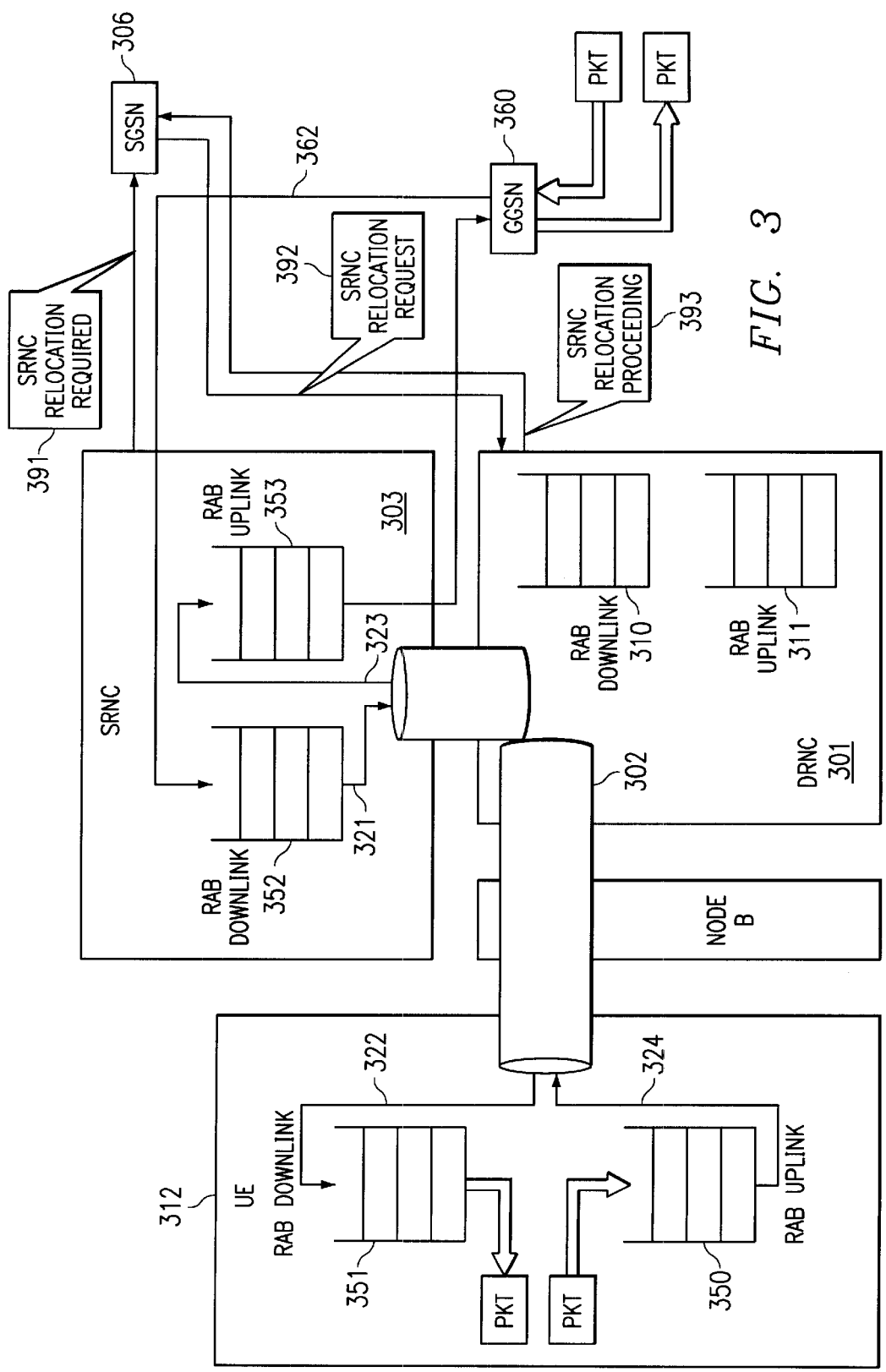
FIGS. 3–6 show block diagrams illustrating the steps involved in the handover procedure in accordance with a preferred embodiment of the present invention.

Turning now to FIGS. 3–6, block diagrams illustrating the steps involved in the handover procedure in accordance with a preferred embodiment of the present invention are shown. Referring first to FIG. 3, the process for preparing DRNC 301 to become the new SRNC is illustrated. Before the handover process begins, UE 312 has a Radio Resource Connection (RRC) 302 to SRNC 303. Note that the RAB downlinks 321, 322 and uplinks 323, 324 are buffered 350–353. Also not that due to soft handover, a DRNC 301 has been established. RRC 302 traverses this DRNC 301 on its way to SRNC 303.

As the handover process begins, SRNC 303 sends a message 391 to SGSN 306 that SRNC relocation is required. Next, SGSN 306 sends an SRNC Relocation Request message 392 to DRNC 301. DRNC 301 then sends SRNC Relocation Proceeding message 393 to SGSN 306. Tunnel description is sent to DRNC 301 by SGSN 306 using "SRNC relocation Request" and "SRNC Relocation Proceeding" messages. Buffers 310 and 311 are created at DRNC 301 and RLC and MAC instances are created in preparation for relocation of UE 312 connection.

Figure 4:
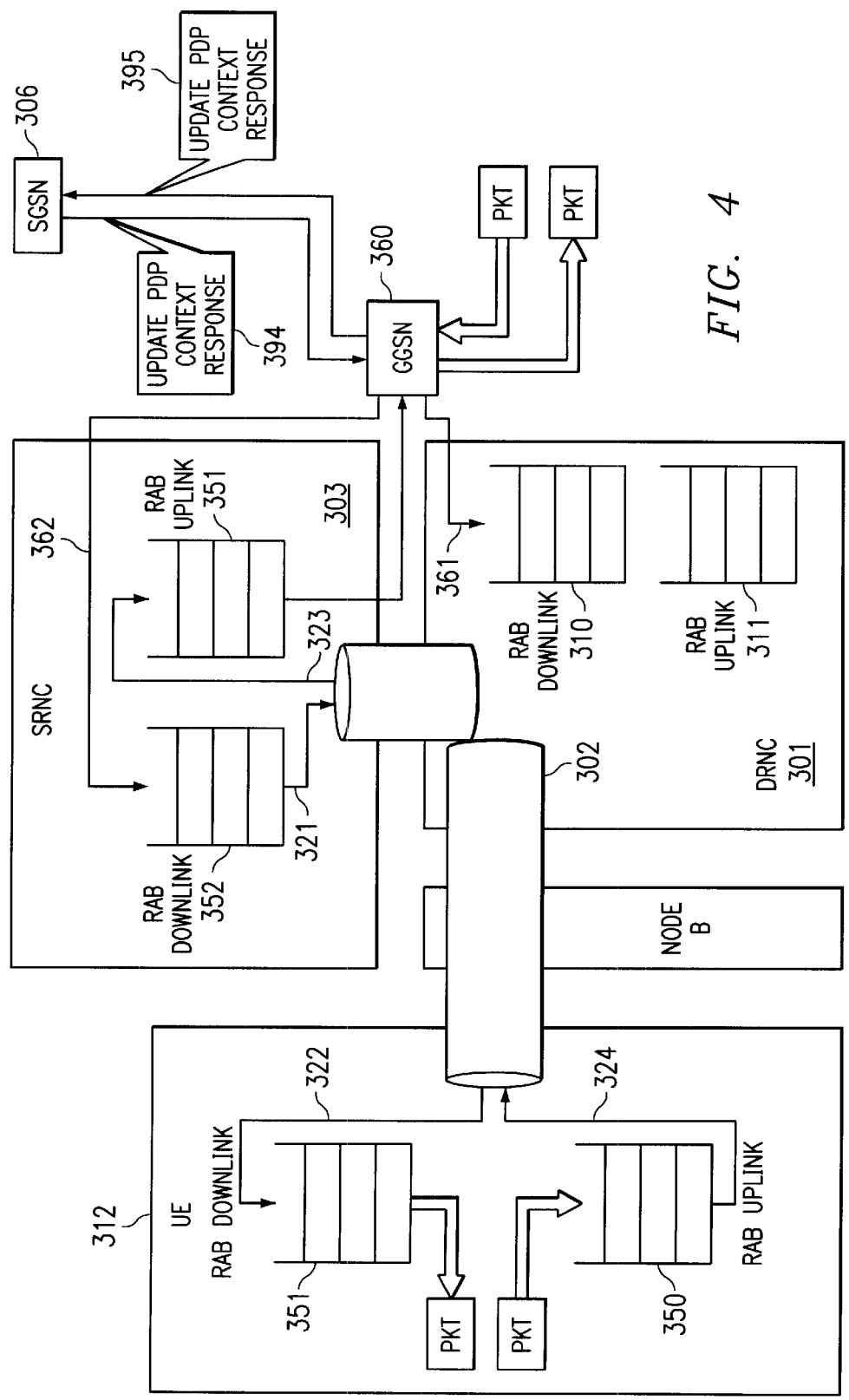

Referring now to FIG. 4, GGSN 360 is informed of pending SRNC Relocation via the "Update PDP Context Request" message 394. (PDP Context is a term used in GPRS (and UMTS) to refer to an active packet data flow between an RNC (or a SGSN in GPRS) and the GGSN that is hosting the PDP context.) GGSN 360 creates a new tunnel 361 for the packet flow between GGSN 360 and DRNC 301 that duplicates the tunnel 362 from GGSN 360 to SRNC 303. GGSN 360 sends duplicate packets in original tunnel 362 and replicated tunnel 361. These duplicate packets are marked duplicates. When GGSN 360 finishes these steps, it sends "Update PDP Context Response" message 395 to SGSN 306.

Figure 5:
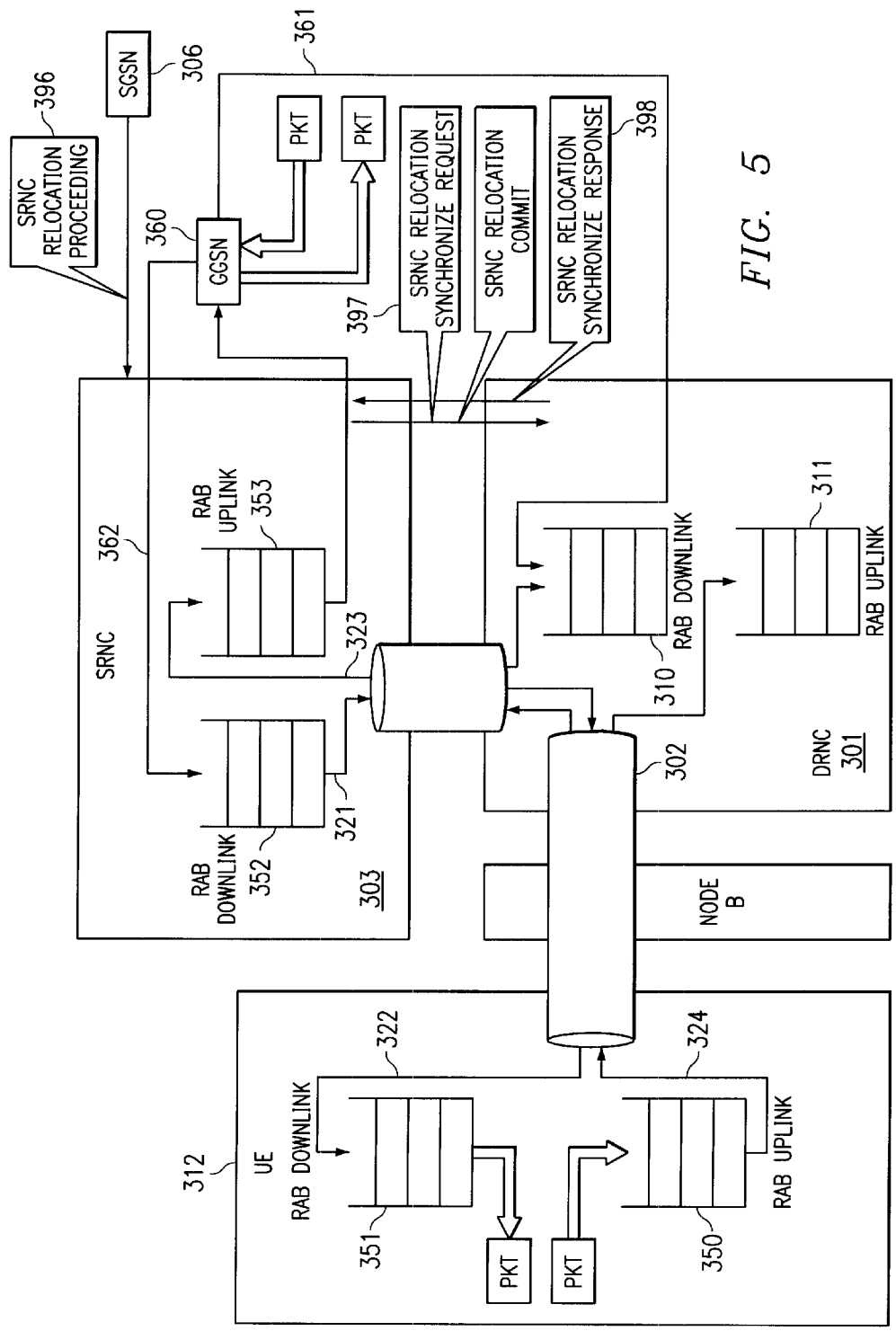

Referring now to FIG. 5, using the "SRNC Relocation Proceeding" message 396, SGSN 306 informs SRNC 303 to start relocation at any time. This is only performed after all GGSNs with active PDP contexts for the UE connection to be relocated are ready and have responded to the SGSN with the "Update PDP Context Response" message. Using "SRNC Relocation Synchronize Request" message 397, SRNC 303 informs DRNC 301 to synchronize RLC, MAC, and GTP tunnel states and buffers and informs DRNC 301 of any state information for RLC, MAC, and GTP tunnels. Specifically, the ciphering function parameters are synchronized, enabling the DRNC to decode the packets traversing through it within RRC 302. DRNC 301 monitors the connection 302 between UE 312 and SRNC 303 that traverses through it to achieve and maintain synchronization. Once synchronized, DRNC 301, using the "SRNC Relocation Synchronize Response" message 398, informs SRNC 303 that DRNC 301 is ready to proceed.

Figure 6:
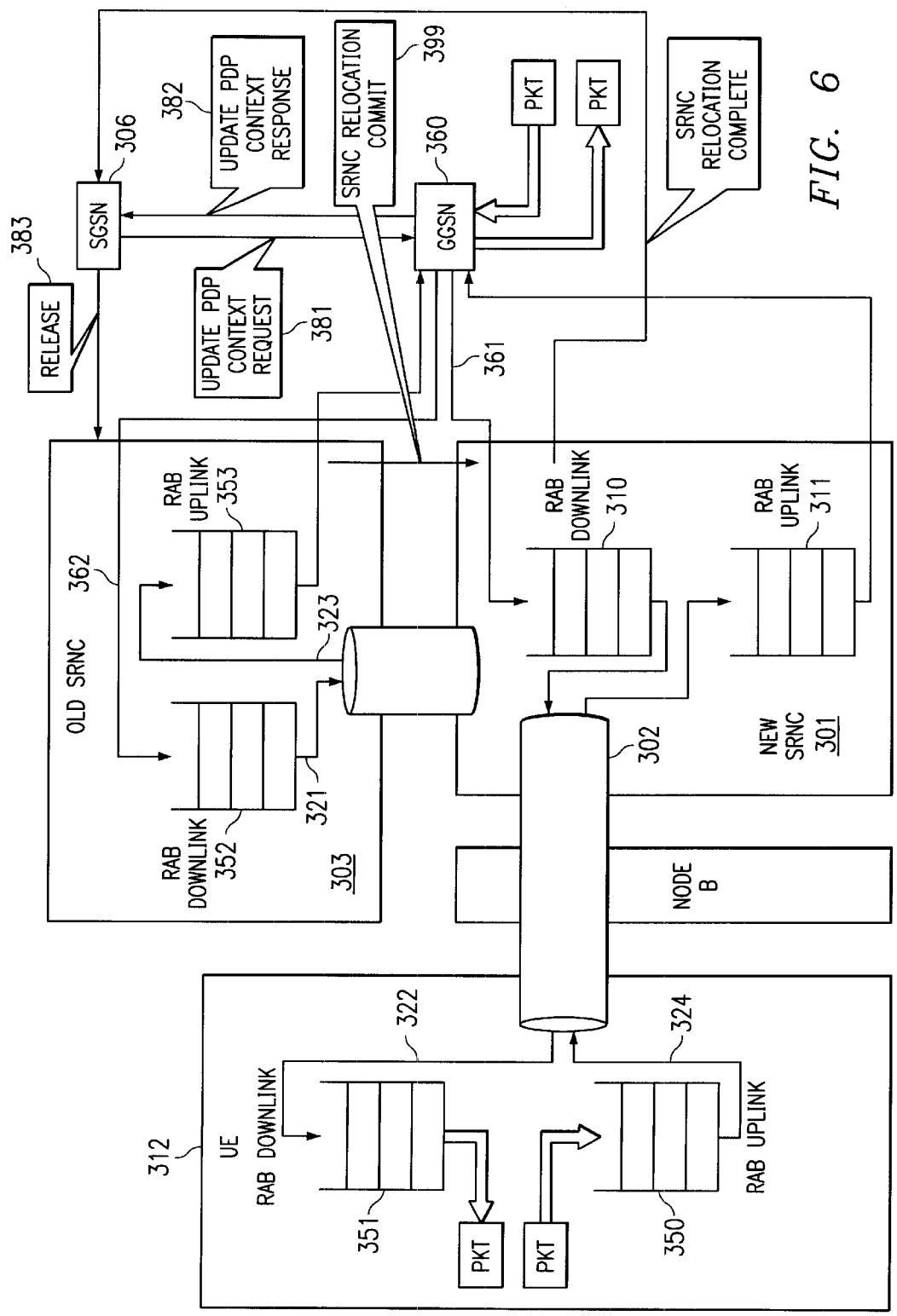

Referring now to FIG. 6, using the "SRNC Relocation Commit" message 399, the "old" SRNC 303 informs the "new" SRNC 301 (that is what was the old DRNC) to start relocation. The "old" SRNC 303 starts marking all uplink packets as "duplicate." The "new" SRNC 301 starts sending uplink packets and marks them "duplicate" as well. The "new" SRNC 301 breaks into the connection towards the UE 312 and takes over the RLC and MAC, picking up where the "old" SRNC 303 was at last. Note that the RLC and MAC connections over the air link are NOT duplicated. Using the "SRNC Relocation Complete" message 380, the "new" SRNC 301 informs SGSN 306 that it has taken over for the "old" SRNC 303. Using the "Update PDP Context Request" message 381, SGSN 306 informs GGSN 360 that the relocation is complete and to return the GTP tunnel 362 to a normal state and to only use the new tunnel towards the "new" SRNC 301. When complete, GGSN 360 sends the "Update PDP Context Response" message 382 to SGSN 306. Using the "Release" message 383, SGSN 306 informs the "old" SRNC 303 to release its connections regarding UE 312 just relocated. The handover is now complete.

Figure 7:
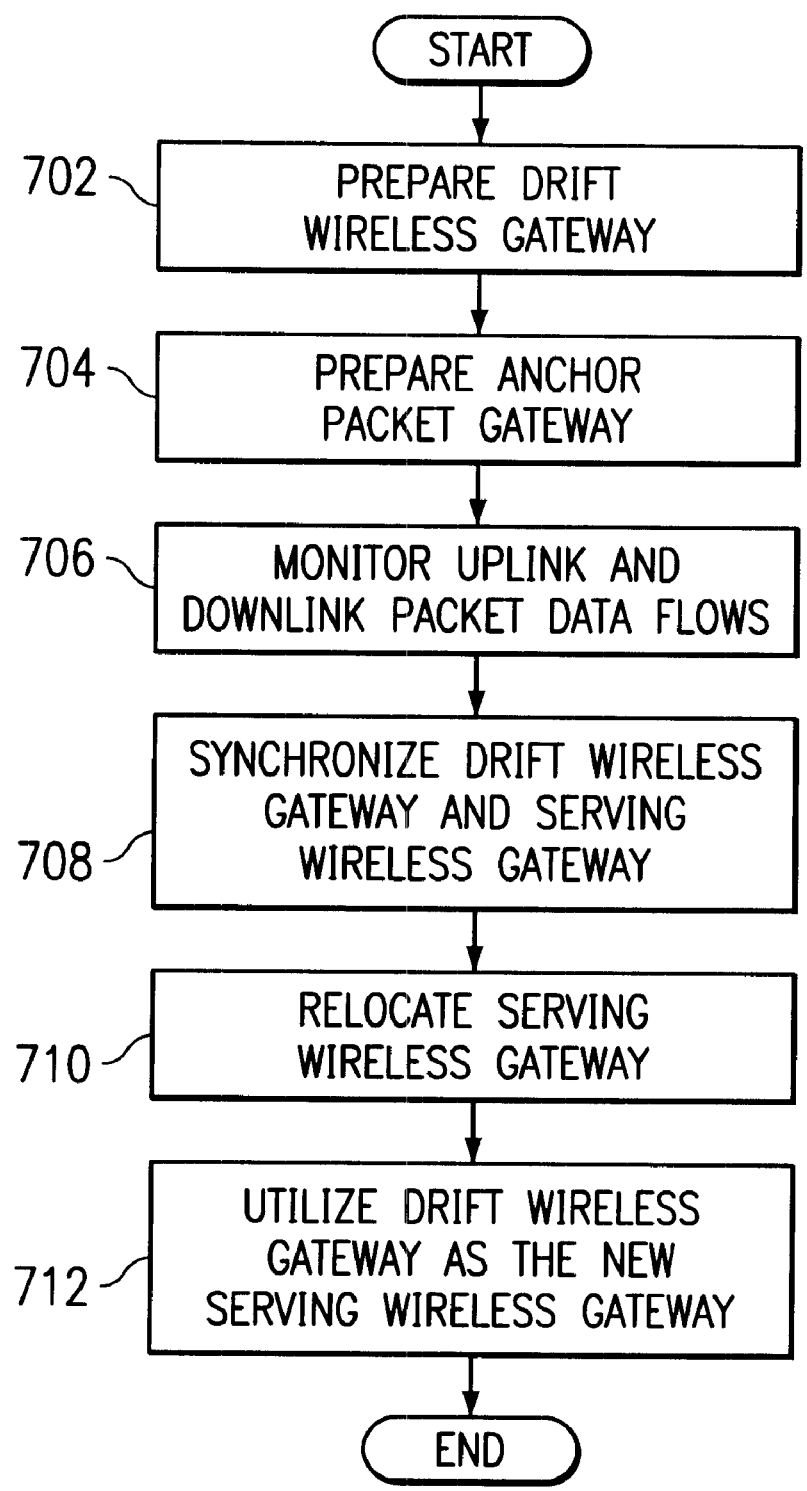
FIG. 7 shows a high-level flow chart illustrating the processes of the present invention.

Tuning now to FIG. 7, a high-level flow chart illustrating the processes of the present invention is depicted. To start, a drift wireless gateway is prepared to become the serving wireless gateway (step 702). The anchor packet gateway is then prepared for serving wireless gateway relocation by having the anchor packet gateway initiate bicasting of downlink packet data flow (step 704). The uplink and downlink packet data flows are monitored at the drift wireless gateway (step 706) and the drift wireless gateway and the serving wireless gateway are synchronized for serving wireless gateway relocation (step 708). Once synchronization is accomplished, the drift wireless gateway becomes the new serving wireless gateway (step 710). The old drift wireless gateway is then utilizes as the new serving wireless gateway (step 712) thus ending the handover process.

Although the above description refers to an RNS, the invention applies equally to any embodiment of a wireless gateway. Similarly, although the above description refers to a GGSN, the invention applies equally to any embodiment of an anchor packet gateway. Furthermore, although the present invention has been described primarily with reference to a GGSN in the handover process, it should be noted that the presently described invention applies to, and may typically be implemented using, multiple GGSNs.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, the processes of the present invention can be applied to other types of communications systems other than UMTS, such as, for example, General Packet Radio Service (GPRS) and Wireless Local Area Network (LAN) (e.g., IEEE 802.11). The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of controlling handover of real-time packet data flow within a wireless telecommunications system packet domain featuring user equipment, a serving wireless gateway, a drift wireless gateway, and an anchor packet gateway without disrupting communication between said user equipment and said anchor packet gateway, said method comprising:

(a) preparing the drift wireless gateway to become the serving wireless gateway;

(b) preparing the anchor packet gateway for serving wireless gateway relocation by having said anchor packet gateway initiate bicasting of downlink packet data flow;

(c) monitoring uplink and downlink packet data flows at the drift wireless gateway and synchronizing the drift wireless gateway and the serving wireless gateway for relocation; and (d) utilizing the drift wireless gateway as a new serving wireless gateway.

2. The method as recited in claim 1, wherein the wireless telecommunications system is a universal mobile telecommunications system.

3. The method as recited in claim 1, wherein the wireless gateway is a radio network controller.

4. The method as recited in claim 1, wherein the anchor packet gateway is a gateway general packet radio service support node.

5. The method as recited in claim 1, wherein the user equipment comprises a wireless telephone.

6. The method as recited in claim 1, wherein the user equipment comprises a data processing system.

7. A system of controlling handover or real-time packet data flow within a wireless telecommunications system packet domain featuring user equipment, a serving wireless gateway, a drift wireless gateway, and an anchor packet gateway without disrupting communication between said user equipment and said anchor packet gateway, said system comprising:

(a) means for preparing the drift wireless gateway to become the serving wireless gateway;

(b) means for preparing the anchor packet gateway for serving wireless gateway relocation by having said anchor packet gateway initiate bicasting of downlink packet data flow;

(c) means for monitoring uplink and downlink packet data flows at the drift wireless gateway and means for synchronizing the drift wireless gateway and the serving wireless gateway for relocation; and (d) means for utilizing the drift wireless gateway as a new serving wireless gateway.

8. The system as recited in claim 7, wherein the wireless telecommunications system is a universal mobile telecommunications system.

9. The system as recited in claim 7, wherein the wireless gateway is a radio network controller.

10. The system as recited in claim 7, wherein the anchor packet gateway is a gateway general packet radio service support node.

11. The system as recited in claim 7, wherein the user equipment comprises a wireless telephone.

12. The system as recited in claim 7, wherein the user equipment comprises a data processing system.

13. A computer program product in computer readable media for use in a data processing system for controlling handover or real-time packet data flow within a wireless telecommunications system packet domain featuring user equipment, a serving wireless gateway, a drift wireless gateway, and an anchor packet gateway without disrupting communication between said user equipment and said anchor packet gateway, said method comprising:

(a) first instructions for preparing the drift wireless gateway to become the serving wireless gateway;

(b) second instructions for preparing the anchor packet gateway for serving wireless gateway relocation by having said anchor packet gateway initiate bicasting of downlink packet data flow;

(c) third instructions for monitoring uplink and downlink packet data flows at the drift wireless gateway and synchronizing the drift wireless gateway and the serving wireless gateway for relocation; and then (d) fourth instructions for utilizing the drift wireless gateway as a new serving wireless gateway.

14. The computer program product as recited in claim 13, wherein the wireless telecommunications system is a universal mobile telecommunications system.

15. The computer program product as recited in claim 13, wherein the wireless gateway is a radio network controller.

16. The computer program product as recited in claim 13, wherein the anchor packet gateway is a gateway general packet radio service support node.

17. The computer program product as recited in claim 13, wherein the user equipment comprises a wireless telephone.

18. The computer program product as recited in claim 13, wherein the user equipment comprises a data processing system.

19. A method of providing communications with a mobile station, comprising the steps of:

providing a data packet path from a node to a gateway, wherein said data packet path traverses a first node controller and a second node controller;

sending uplink data packets from said second node controller to said gateway via a radio access bearer connection;

receiving downlink data packets from said gateway to said second node controller via said radio access bearer connection; and responsive to a request relocate a serving node controller from said second node controller to said first node controller,
    duplicating said uplink data packets from said gateway and sending duplicated uplink data packets to said first node controller;
    sending said uplink data packets from said first node controller to said gateway;
    wherein said gateway marks uplink data packets sent to said first node controller and to said second node controller as duplicates and wherein said first node controller and said second node controller mark said uplink data packets as duplicates;
    said first node controller correlates said uplink data packets received from said gateway with said uplink data packets received from said second node controller; and
    responsive to a determination that said first node controller is ready to become said serving node controller, refraining from sending uplink data packets from said gateway to said second node controller and refraining from sending said downlink data packets from said first node controller to said second node controller.

* * * * *